US007146626B1

(12) United States Patent
Arsenault et al.

(10) Patent No.: US 7,146,626 B1
(45) Date of Patent: Dec. 5, 2006

(54) METHOD AND APPARATUS FOR STORING AND DISPLAYING DIGITAL OBJECTS ASSOCIATED WITH AN ELECTRONIC TELEVISION PROGRAM GUIDE USING FUZZY LOGIC

(75) Inventors: Robert G. Arsenault, Redondo Beach, CA (US); Glenn C. Creel, Seal Beach, CA (US); Kenneth D. Seibert, Redondo Beach, CA (US); Tam T. Leminh, Cypress, CA (US); Craig A. Finseth, St. Paul, MN (US); Philip E. Hsiao, Eden Prairie, MN (US); Jeffrey A. Brown, Roseville, MN (US)

(73) Assignee: The DirecTV Group, Inc., El Segundo, CA (US)

( * ) Notice: Subject to any disclaimer, the term of this patent is extended or adjusted under 35 U.S.C. 154(b) by 0 days.

(21) Appl. No.: 09/535,105

(22) Filed: Mar. 24, 2000

Related U.S. Application Data

(60) Provisional application No. 60/126,917, filed on Mar. 29, 1999, provisional application No. 60/126,927, filed on Mar. 29, 1999, provisional application No. 60/126,573, filed on Mar. 29, 1999.

(51) Int. Cl.
*G06F 3/00* (2006.01)
*G06F 13/00* (2006.01)
*H04N 5/445* (2006.01)

(52) U.S. Cl. .............................. 725/46; 725/34; 725/47; 725/63; 725/70

(58) Field of Classification Search .................. 725/39, 725/47, 46, 25, 27, 28, 31, 131, 132, 139, 725/140, 151, 152, 34, 63–65, 68, 70, 121
See application file for complete search history.

(56) References Cited

U.S. PATENT DOCUMENTS

| 5,652,613 | A | * | 7/1997 | Lazarus et al. ................ 725/50 |
| 5,666,645 | A | | 9/1997 | Thomas et al. |
| 5,724,521 | A | | 3/1998 | Dedrick |
| 5,978,649 | A | * | 11/1999 | Kahn ........................... 725/25 |
| 6,088,722 | A | * | 7/2000 | Herz et al. ................... 709/217 |
| 6,177,931 | B1 | * | 1/2001 | Alexander et al. ............ 725/52 |
| 6,324,338 | B1 | | 11/2001 | Wood et al. |
| 6,481,011 | B1 | * | 11/2002 | Lemmons ..................... 725/47 |
| 2002/0095676 | A1 | * | 7/2002 | Knee et al. ................... 725/46 |
| 2002/0054752 | A1 | | 5/2005 | Wood et al. |

FOREIGN PATENT DOCUMENTS

| WO | WO97/26612 | 7/1997 |
| WO | WO99/01984 | 1/1999 |

* cited by examiner

*Primary Examiner*—Ngoc Vu
(74) *Attorney, Agent, or Firm*—Georgann S. Grunebach

(57) ABSTRACT

The apparatus and method of the present invention provides a direct-to-home integrated receiver/decoder (IRD) and a program for storing and displaying digital objects associated with an electronic television program guide using fuzzy logic. The method and apparatus maintains and adapts a user profile in order to efficiently select digital objects associated with an electronic program guide. The fuzzy logic based user profile may be used to select digital program guide objects for deletion from memory and/or to efficiently select digital program guide objects for display in an electronic program guide. Selection is based on fuzzy variables associated with the objects. In this manner, memory requirements and the number of programs displayed are reduced to decrease cost and reduce the amount of time a user must spend viewing the program guide.

14 Claims, 7 Drawing Sheets ional application Ser. No. 60/126,927, filed Mar. 29, 1999, and
METHOD AND APPARATUS FOR STORING AND DISPLAYING DIGITAL OBJECTS ASSOCIATED WITH AN ELECTRONIC TELEVISION PROGRAM GUIDE USING FUZZY LOGIC

RELATED APPLICATIONS

This application claims priority from provisional application Ser. No. 60/126,917, filed Mar. 29, 1999, provisional application Ser. No. 60/126,927, filed Mar. 29, 1999, and provisional application Ser. No. 60/126,573, filed Mar. 29, 1999.

TECHNICAL FIELD OF THE INVENTION

The present invention relates in general to a method and apparatus for displaying a television program guide and in particular to storing and displaying digital objects associated with an electronic television program guide, based on fuzzy logic.

BACKGROUND OF THE INVENTION

Television signal distribution systems typically broadcast television signals to individual users or subscribers on a plurality of individual television channels. The channels may be modulated onto one or more carrier frequencies within a discernable frequency band. Some wireless television signal distribution systems use one or more geosynchronous satellites to broadcast a broadband television signal to receiver units within a large geographic area, while other wireless systems are land-based, using one or more transmitters located within smaller geographic areas to broadcast to individual receiver units within those geographic areas.

The receiver unit receives and processes transmitted waveforms. The receiver unit in a satellite systems typically includes a satellite dish connected by a cable to an integrated receiver/decoder unit (IRD). The satellite dish is aimed toward the satellite, and the IRD is connected to the user's television in a similar fashion to a conventional cable-TV decoder.

Along with the audio and video signals associated with the television channels, the satellite transmits various digital files such as text and graphics. These files may be used by the IRD to provide the user with additional information such as an electronic program guide (e.g., a grid of shows with start and stop times). Typically, the electronic program guide is arranged by listing all of the channels in ascending order vertically and a certain number of future half-hour blocks in chronological order horizontally. However, this presents a problem to the user. Often there may be more than a hundred channels to choose from. Scrolling through the entire list can be burdensome and time consuming. Further, the increasing the memory of the IRD in order to store the data associated with all these channels increases the cost of the IRD.

SUMMARY OF THE INVENTION

The present invention is directed to a direct-to-home integrated receiver/decoder (IRD) and a program for storing and displaying digital objects associated with an electronic television program guide using fuzzy logic. The method and apparatus maintains and adapts a user profile in order to efficiently select digital objects for deletion from memory and to efficiently select digital objects for display in an electronic program guide. In this manner, memory requirements and the number of programs displayed are reduced to decrease cost and reduce the amount of time a user must spend viewing the program guide.

In one aspect, the invention is directed to a method for selecting a first digital object for display in an electronic television program guide. The method begins by receiving the first digital object from a direct-to-home satellite communication system, and determining first and second fuzzy variable values associated with the first digital object. Subsequently, the method determines a first priority by mapping the first and second fuzzy variable values onto a profile surface adapted for determining preferences associated with a television viewer. This priority is then compared to a predefined threshold. If the first priority crosses a predefined threshold, the first digital object is selected for display in the electronic television program guide.

In certain embodiments, the method further comprises the steps of receiving a second digital object from the direct-to-home satellite communication system, determining third and fourth fuzzy variable values associated with the second digital object, and setting the predefined threshold by mapping the third and fourth fuzzy variable values onto the profile surface. In some embodiments the method further comprises the step of displaying the first digital object in the electronic television program guide. In one embodiment, the method further comprises the steps of selecting a color based on the comparison between the first priority and the predefined threshold, and associating the display of the first digital object with the selected color. In another embodiment, the method further comprises the steps of selecting a number based on the comparison between the first priority and the predefined threshold, and associating the display of the first digital object with the selected number.

In another aspect, the invention is directed to a method for selecting a first digital object associated with an electronic television program guide for deletion from memory. The method begins by receiving the first digital object from a direct-to-home satellite communication system, and determining first and second fuzzy variable values associated with the first digital object. Subsequently, the method determines a first priority by mapping the first and second fuzzy variable values onto a profile surface adapted for determining preferences associated with a television viewer. This priority is then compared to a predefined threshold. If the first priority crosses a predefined threshold, the first digital object is selected for deletion from a memory.

In yet another aspect, the invention is directed to an apparatus for displaying a first digital object in an electronic television program guide. The apparatus comprises a receiver that receives the first digital object from a direct-to-home satellite communication system. The apparatus further comprises a controller, operatively coupled to the receiver, the controller determining first and second fuzzy variable values associated with the first digital object, the controller determining a first priority by mapping the first and second fuzzy variable values onto a profile surface adapted for determining preferences associated with a television viewer, the controller comparing the first priority to a predefined threshold. Still further, the apparatus comprises a display, operatively coupled to the controller, the controller causing the display to present the first digital object in the electronic television program guide if the first priority crosses the predefined threshold.

In certain embodiments, the receiver is further adapted to receive a second digital object from the direct-to-home satellite communication system, and the controller is further adapted to determine third and fourth fuzzy variable values associated with the second digital object, and the controller is further adapted to determine the predefined threshold by mapping the third and fourth fuzzy variable values onto the profile surface. In some embodiments, the controller is further adapted to select a color based on the comparison between the first priority and the predefined threshold, and the controller is further adapted to associate the display of the first digital object with the selected color. In one embodiment, the controller is further adapted to select a number based on the comparison between the first priority and the predefined threshold, and the controller is further adapted to associate the display of the first digital object with the selected number.

In still another aspect, the invention is direct to an apparatus for selecting a first digital object associated with an electronic television program guide for deletion from memory. The apparatus comprises a receiver that receives the first digital object from a direct-to-home satellite communication system. The apparatus further comprises a controller, operatively coupled to the receiver, the controller determining first and second fuzzy variable values associated with the first digital object, the controller determining a first priority by mapping the first and second fuzzy variable values onto a profile surface adapted for determining preferences associated with a television viewer, the controller comparing the first priority to a predefined threshold. Still further, the apparatus comprises a memory, operatively coupled to the controller, the controller causing the memory to delete the first digital object if the first priority crosses the predefined threshold.

BRIEF DESCRIPTION OF THE DRAWINGS

These and other features and advantages of the present invention will be apparent to those of ordinary skill in the art in view of the detailed description of the preferred embodiment which is made with reference to the drawings, a brief description of which is provided below.

DETAILED DESCRIPTION OF THE PREFERRED EMBODIMENTS

Figure 1:
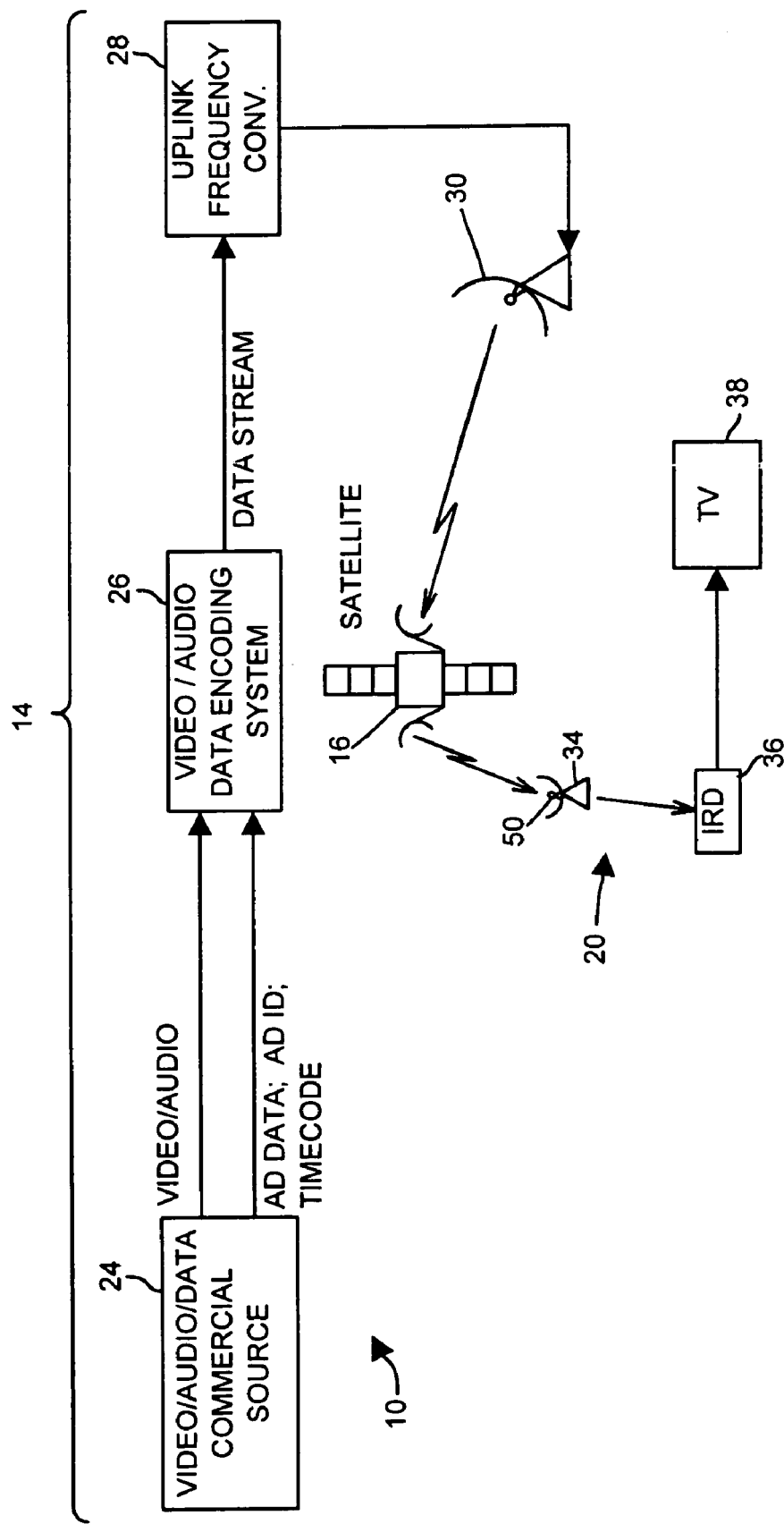
FIG. 1 is a block diagram of a direct broadcast satellite system that implements the method and apparatus of the present invention.

Although the following description focuses on the selection of digital objects to store and display electronic television program guides in a broadcast satellite system, persons of ordinary skill in the art will readily appreciate that the teachings of the present invention are in no way limited to satellite broadcasts or electronic program guides. To the contrary, any system which might benefit from digital object selection which is more consistent with a user's preferences may implement the teachings of the present invention.

In general, television signal distribution systems generally rely on either a cable network or on free-space propagation for delivering television signals to individual users or subscribers. Cable-based television systems transmit one or more individual television signals or "channels" over wire, while free-space propagation systems transmit one or more channels over-the-air, i.e., in a wireless manner. Most large-scale cable and wireless television signal distribution systems broadcast a broadband television signal having a plurality of individual television signals or channels modulated onto one or more carrier frequencies within a discernable frequency band. Some wireless television signal distribution systems use one or more geosynchronous satellites to broadcast a broadband television signal to receiver units within a large geographic area, while other wireless systems are land-based, using one or more transmitters located within smaller geographic areas to broadcast to individual receiver units within those geographic areas.

Typically, such systems include a receiver for receiving and processing transmitted waveforms. One type of receiver is part of a "wireless digital television" system which is utilized by the DIRECTV® broadcast service. It and similar systems allow consumers to receive directly to their homes over 175 television channels broadcast from geosynchronous satellites. The receiver includes a small (e.g., 18-inch) satellite antenna (e.g., reflective dish and LNB) connected by a cable to an integrated receiver/decoder unit (IRD). The satellite antenna is aimed toward the satellites, and the IRD is connected to the user's television in a similar fashion to a conventional cable-TV decoder.

At a satellite uplink facility, video, audio, and related information data signals are digitally encoded into a packetized data stream, multiplexed with other data signals, compressed (if required), mated with error correction codes, modulated on one or more carriers (e.g., Ku-band), and uplinked to a geosynchronous satellite. The satellite amplifies the received signal, shifts the signal to a different carrier frequency band and transmits (downlinks) the frequency shifted signal to earth for reception at individual receiver stations. A plurality of signals at different frequencies and/or polarizations are typically processed. Receiver stations, which are typically located at the user's dwelling, receive the satellite signals. The receiver stations include an antenna, which preferably is in the form of a satellite dish, along with an integrated receiver/decoder (IRD). An LNB (low noise block) of the satellite antenna shifts the Ku-band signal down to an L-band signal which is transmitted through the cable to the IRD. The IRD recovers the originally transmitted digital video, audio, and data. In the preferred embodiment, the uplink and downlink broadband signals may be divided into a plurality of transponder signals, each having a plurality of individual channels.

In the IRD, front-end circuitry receives the L-band signal and converts it to the original digital data stream of video, audio, and related information signals. The digital data stream is fed to video/audio decoder circuits which perform the main video/audio processing functions such as demultiplexing and decompression. A microprocessor controls the overall operation of the IRD, including the selection of parameters, the set-up and control of components, channel selection, viewer access to different programming packages, blocking certain channels, and many other functions. The compression and decompression of packetized video and audio signals may be accomplished according to the Motion Picture Expert Group (MPEG) standards for performing digital video/audio compression. Thus, the IRD unit typically includes an MPEG-1 and/or MPEG-2 video/audio decoder in order to decompress the received compressed video/audio.

Typically, the received packets are presented to a transport circuit that is in communication with the microprocessor. The microprocessor informs the transport circuit about which packets are of interest. For example, if the IRD is instructed by the user to display the ESPN station, the microprocessor instructs the transport to receive and process all packets (including particularly the video, audio and data packets) associated with the ESPN programming. The information about how to receive ESPN, or any other programming channel, is provided via the program guide data stream. In general, the program guide identifies (based on header information) those packets that must be assembled in order to construct the audio, video and data for any of the available programs. Program guide data also includes digital objects needed to construct a graphical listing of the show times and channels for available programming, program description data, program rating data, program category data, and other data such as objects describing advertisements for placement in the program guide. The transport identifies desired ESPN packets by header information in the packet, strips off the payload portion of the packet, and forwards the payloads to an audio/video decoder (or optionally first to an intermediate storage location). The decoder then stores the payloads in designated memory locations. The ESPN video and audio payloads are then called up from their memory locations as needed, decoded, converted to, e.g., NTSC analog signals, or a digital serial or parallel TV signal, and provided to a television monitor for display.

FIG. 1 is a block diagram of a transmission and reception system 10 embodying features of the present invention. The illustrated system 10 includes a transmission station 14, a relay 16, and a plurality of receiver stations, one of which is shown at reference numeral 20. A wireless airlink provides the communications medium between the transmission station 14, the relay 16, and the receiver station 20. The transmission station 14 includes a programming/data source 24, a video/audio/data encoding system 26, an uplink frequency converter 28, and an uplink satellite antenna 30. The relay 16 is preferably at least one geosynchronous satellite. The receiver station 20 includes a satellite reception antenna 34 which may comprise a low-noise-block (LNB) 50, a receiver unit (or IRD) 36 connected to the LNB 50, and connected to the LNB 50, and a television monitor 38 connected to the receiver unit 36.

In operation, the transmission station 14 can receive video and audio programming from a number of sources, including satellites, terrestrial fiber optics, cable, or tape. Preferably, the received programming signals, along with data signals such as electronic scheduling data and conditional access data, are sent to the video/audio/data encoding system 26 where they are digitally encoded and multiplexed into a packetized data stream using a number of conventional algorithms, including convolutional error correction and compression. In a conventional manner, the encoded data stream is modulated and sent through the uplink frequency converter 28 which converts the modulated encoded data stream to a frequency band suitable for reception by the satellite 16. Preferably, the satellite frequency is Ku-band. The modulated, encoded data stream is then routed from the uplink frequency converter 28 to an uplink satellite antenna 30 where it is broadcast toward the satellite 16 over the airlink. The satellite 16 receives the modulated, encoded Ku-band data stream and re-broadcasts it downward toward an area on earth that includes the various receiver stations 20. The LNB 50 of the satellite antenna 34 of the receiver station 20 shifts the Ku-band signal down to an L-band signal which is transmitted to the receiver unit 36.

Figure 2:
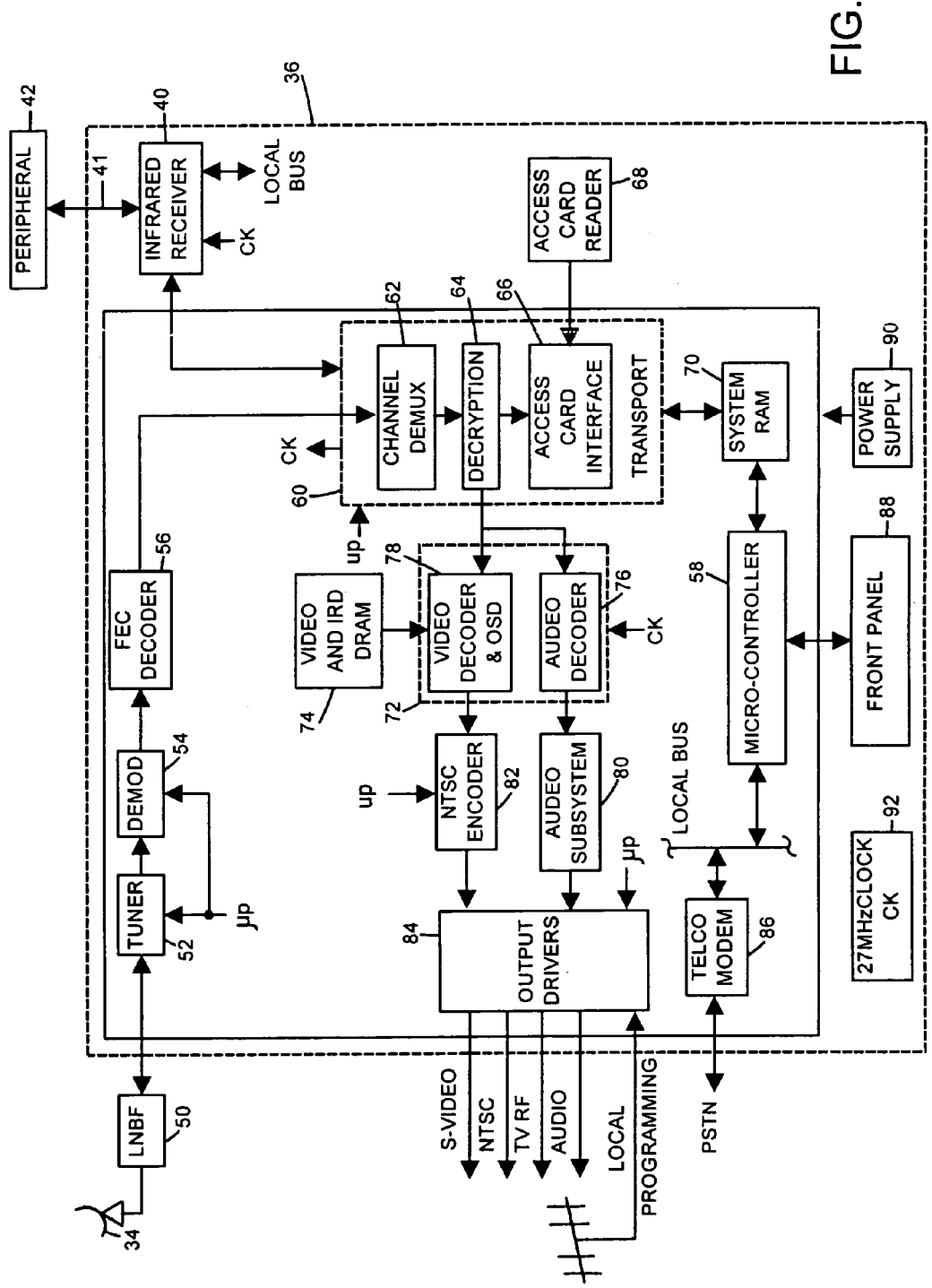
FIG. 2 is a block diagram illustrating more details of the receiver station of FIG. 1 embodying the present invention.

FIG. 2 is a more detailed block diagram of a portion of the receiver unit 36 shown in FIG. 1. Front-end circuitry inside the receiver unit 36 receives the L-band RF signals from the LNB 50 and converts them back into the original digital data stream. Decoding circuitry, receives the original data stream and performs video/audio processing operations such as demultiplexing and decompression. A microprocessor or CPU 58 controls the overall operation of the receiver unit 36, including the selection of parameters, the set-up and control of components, channel selection, the theater's access to different movie packages, and many other functions. In the preferred embodiment of the present invention, the microprocessor 58 controls how digital objects (e.g., text, graphics, advertisements) are processed (e.g., stored, displayed).

The receiver unit 36 includes a tuner 52, demodulator 54, FEC decoder 56, a microcontroller 58, a transport circuit 60, a channel demultiplexer 62, decryption circuit 64, an access card interface 66, an access card reader 68, a system RAM 70, an audio/video decoder circuit 72 having a random-access-memory (RAM) 74, audio decoder 76, video decoder 78, an audio digital-to-analog circuit 80, an NTSC (or other) encoder 82, output drivers 84, a modem connection 86, a front panel user interface 88, and a power supply 90, coupled together as illustrated. A 27 MHZ clock signal generator 92 is also provided. The clock generator 92 generates a clock signal (CK) which is coupled to the audio/video decoder circuit 72 and which is frequency-calibrated by a signal received from the transport circuit 60, as shown.

The transport 60 receives the transport stream of digitized data packets containing video, audio, data, scheduling information, and other data. The digital packet information contains identifying headers as part of its overhead data. Under control of the microcontroller 58, the channel demultiplexer 62 filters out packets that are not currently of interest, and routes the data packets that are of interest through the decryption circuit 64 and, in the case of some packets, also through the access control circuits 66, 68 to their proper downstream destination. The decryption circuit 64 provides decryption for the data packets that have been encrypted. The access control circuits 66, 68 provide access control by any conventional means. For example, access control may be achieved by requiring a data packet to have a proper authorization code in order to be passed to the decryptor 64 and/or video decoder 78. The access card reader 68 can interface with an access card (not shown) that will receive the packet authorization code, determine its validity, and generate a code that confirms to the transport 60 that the subject data packet is authorized.

The authorized data of interest, which now consists of the payload portions of the received data packets, are forwarded to decoder DRAM 74 for buffering and may optionally be intermediately stored in system RAM 70. The audio/video decoder 72 decodes the payloads stored in DRAM 74, as needed. The requested data is routed from the RAM 70 through the transport 60 to the audio/video decoder 72. At that time, the data is routed to the video decoder 78 (which includes display generating circuitry) and the NTSC (or other) encoder 64. The video decoder 78 reads in the compressed video data from the DRAM 74, parses it, creates quantized frequency domain coefficients, then performs an inverse quantization, inverse discrete cosine transform (DCT) and motion compensation. At this point, an image has been reconstructed in the spatial domain. This image is then stored in a frame buffer in the DRAM 74. At a later time, the image is read out of the frame buffer in DRAM 74 and passed through the display circuitry to the encoder 82. The display circuitry (located in the video decoder 78) generates the graphics that allow text such as the electronic program guide data to be displayed. The encoder 78 converts the digital video signals to analog according to the NTSC standard or to other desired output protocols (e.g., ATSC), thereby allowing video to be received by a conventional television 38 or other video output device (see FIG. 1).

Figure 3:
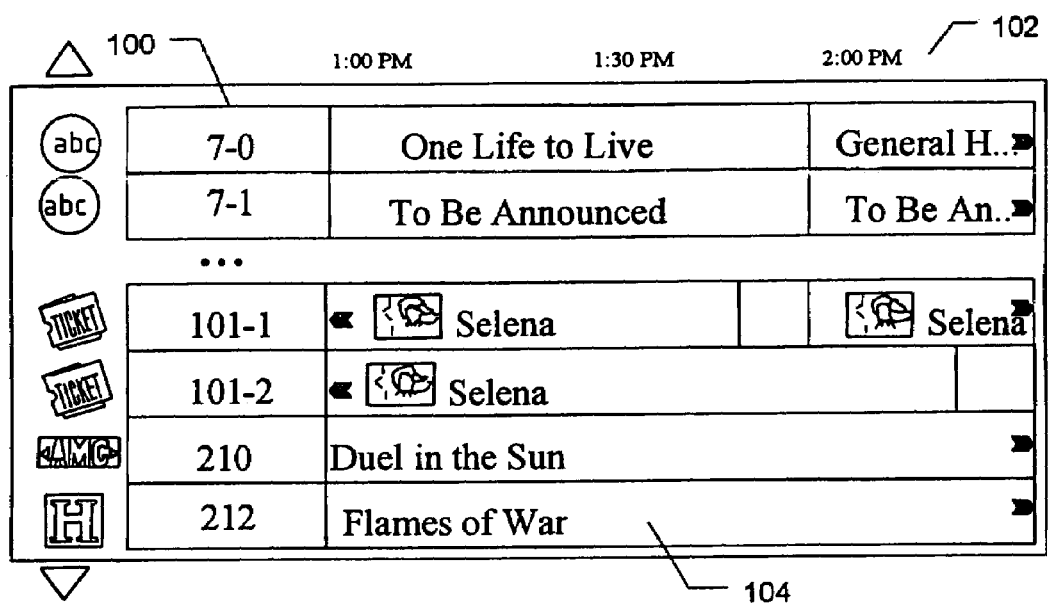
FIG. 3 is a block diagram illustrating a generic example of an electronic television program guide.

Illustrated in FIG. 3 is an example of an electronic television program guide. Typically, channels 100 are listed in numeric order vertically and times 102 are listed in chronological order horizontally. However, in the preferred embodiment, channels 100 may be listed in a prioritized order based on a user profile (e.g., a user's top ten list based on prior viewing habits and fuzzy logic) as described in detail below. The grid boxes 104 in the body of the program guide are typically filled with text and/or graphics representing television shows and/or other programming available at the associated time on the associated channel. However, the guide may also display advertising objects or any other type of information. In addition, in the preferred embodiment, the grid boxes may be color coded (e.g., all sports in green and basketball in dark green) based on a user profile as described in detail below. Further, the display of certain advertising objects may be based on the user's profile and properties of the advertising object such as its display time, display priority, contents, description, etc.

Figure 4:
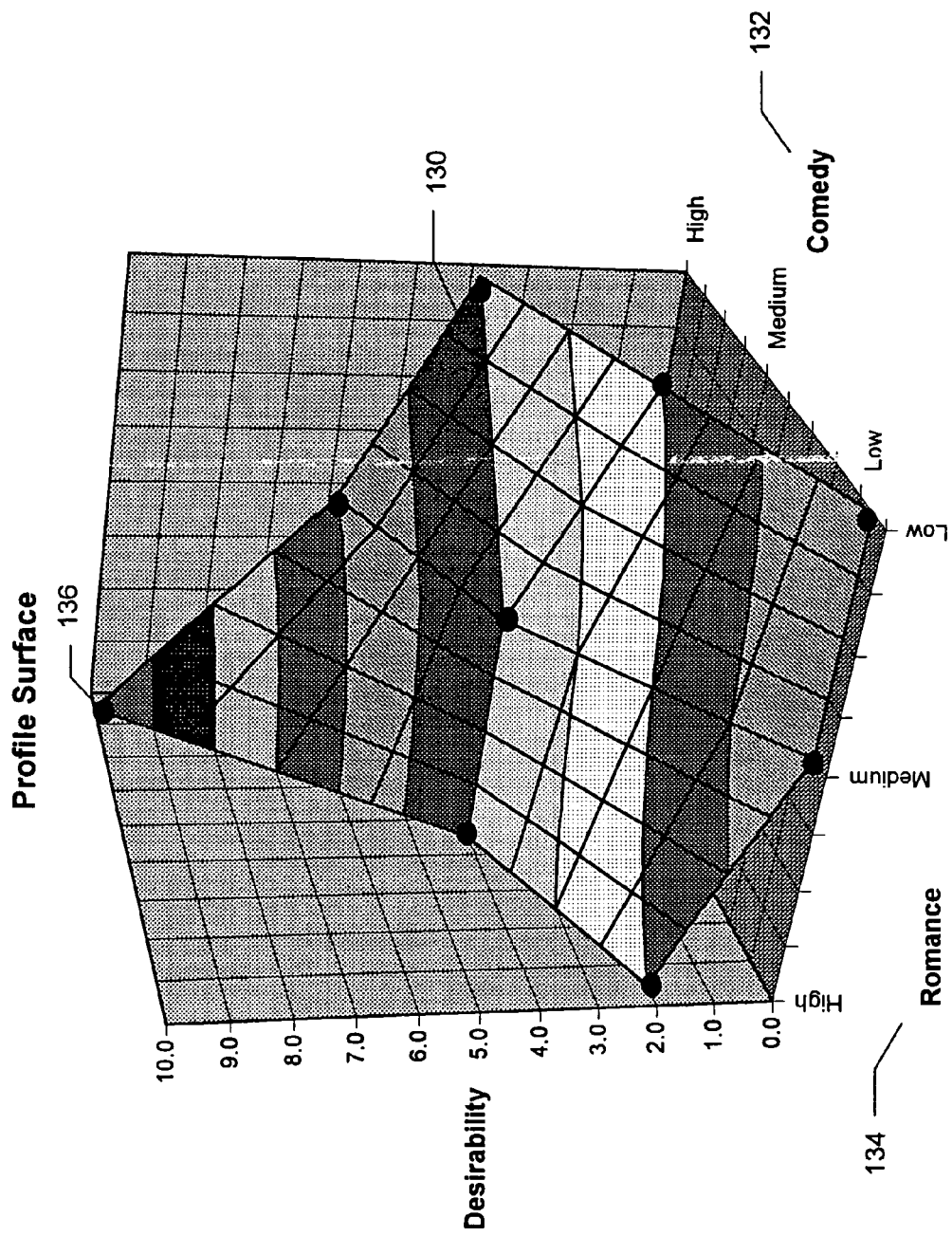
FIG. 4 is a three dimensional graph of a profile surface, with two input variables and nine design coordinates, used to determine a desirability associated with the two input variables.

Illustrated in FIG. 4 is one potential three dimensional profile surface 130 (i.e., a fuzzy associative memory) indicative of a particular user's preferences. Program guide objects are prioritized for storage and/or display by determining their degree of membership in each fuzzy input variable and mapping them on to the multi-dimensional profile surface 130. The final dimension of the profile surface 30 (the height in this case) is the desirability of the program guide objects (greater height means greater desirability). In this example, there are two input variables, namely, 'Comedy' 132 and 'Romance' 134. However, it should be understood that any number of different input variables could be used (e.g., 'now showing', 'adventure', 'rating', 'year', 'duration', 'cast', 'director', 'producer', etc.), thereby creating a multi-dimensional profile surface (e.g., five input variables would require a six dimensional profile surface). Although this description focuses on one profile surface 130, any number of profile surfaces may be employed without departing from the scope or spirit of the invention. For example, a different profile surface 130 for each member of a household may be stored and retrieved based on a user name.

In practice only a few points on the profile surface 130 are designed coordinates 136 that are stored in the system, with the remainder being determined via interpolation. In this example nine design coordinates 136 are used to define the three dimensional profile surface 130, one for each combination of low, medium, and high of the two input variables. However, it should be understood that any number of design coordinates 136 could be used to define the profile surface 130.

Figures 5, 6:
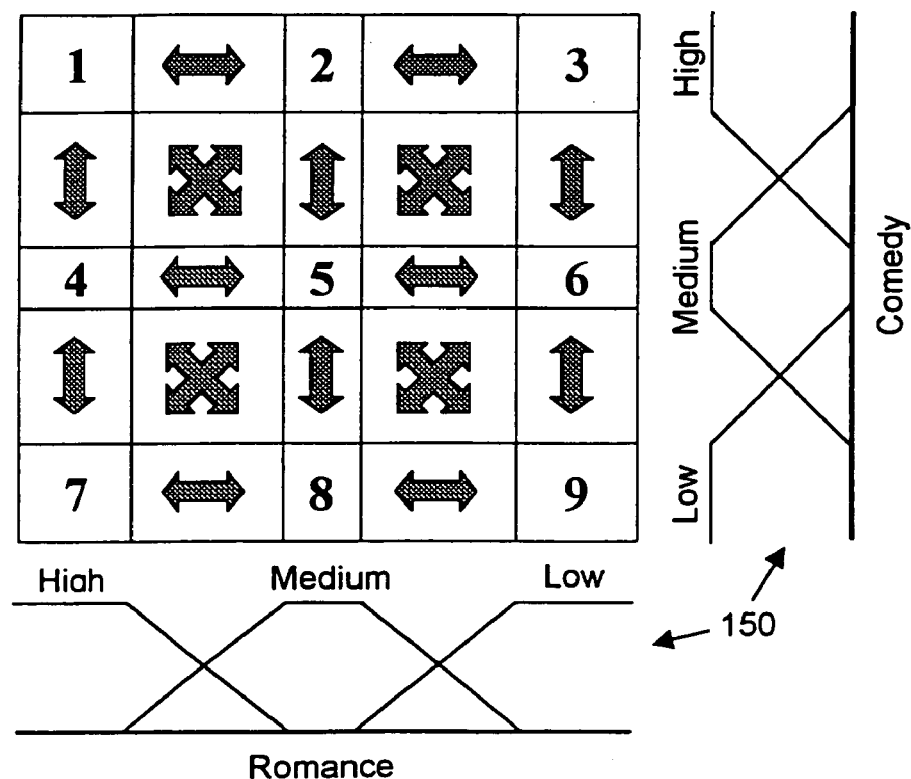
FIG. 5 is a matrix of rules used to frame the profile surface of FIG. 4.
FIG. 6 is the matrix of rules of FIG. 4 with interpolated areas between the rules and trapezoidal membership functions on the axes to shape the profile surface of FIG. 3.

Illustrated in FIG. 5 are rules, depicted in matrix form, associated with the design coordinates 136 used to construct the profile surface 130 of FIG. 4. For example, rule number one 140 states that if the romance level associated with a particular show is high, and the comedy level associated with the same show is high, then set the desirability to very high, where very high is represented by the value ten. The rules used to construct this exemplary matrix are as follows:

1) if the romance level is high and the comedy level is high, then set the desirability to very high;
2) if the romance level is medium and the comedy level is high, then set the desirability to medium high;
3) if the romance level is low and the comedy level is high, then set the desirability to medium low;
4) if the romance level is high and the comedy level is medium, then set the desirability to medium low;
5) if the romance level is medium and the comedy level is medium, then set the desirability to medium low;
6) if the romance level is low and the comedy level is medium, then set the desirability to low;
7) if the romance level is high and the comedy level is low, then set the desirability to low;
8) if the romance level is medium and the comedy level is low, then set the desirability to very low;
9) if the romance level is low and the comedy level is low, then set the desirability to very low.

Consider the matrix a very coarse view of the profile surface 130 looking straight down from above. The values of the design coordinates 136 (the priority in this example) are the outputs of the rules. The weight each of these rules carries can be adjusted by modifying the value of its output, thereby altering the shape of the profile surface 130.

Illustrated in FIG. 6 is another downward view of the profile surface 130. The rule numbers associated with the design coordinates 36 are indicated in nine of the locations. A single rule governs the priority in these areas. The arrows indicate regions of the profile surface 130 where more than one rule applies and interpolation is used. Trapezoidal membership functions 150 along the axes allegorize overlapping areas where more than one label of an input is partially true at the same time. The centroids of these trapezoids can be adjusted to alter the shape of the profile surface 130. Of course, shapes other than trapezoids could be used.

Given the dynamic environment in which such a system is deployed, determining the best shape for the profile surface 130 is a moving target. Therefore, in the method of the present invention the profile surface 130 can be continually adjusted during operation to home in on the optimal shape and optimize the accuracy of the system.

In one embodiment, the weights of the rules and/or the centroids of the trapezoidal membership functions are adjusted (in affect the shape of the profile surface is adjusted) in response to one or more performance metrics. Performance metrics are any type of feedback the system receives. For example, the percentage and/or type of "top ten" programs selected could be used, or the selection of advertisement types could be used. The system may adjust one or more of the weights and/or centroids in a random direction. If the performance metric improves, the adjustment continues in the same direction. If the performance metric degrades, another random direction is chosen. Eventually, in a stable environment, the system will converge on a small set of near optimal profile surface 130 shapes; a "circle" of convergence. In a dynamic environment it will continue to chase the optimal profile surface 30. Large adjustments will converge faster, but will also create a larger circle of convergence. Of course, the size of the adjustment need not be constant. The system could use large adjustments when necessary to converge and then small adjustments to linger in a tight circle of convergence.

Figure 7:
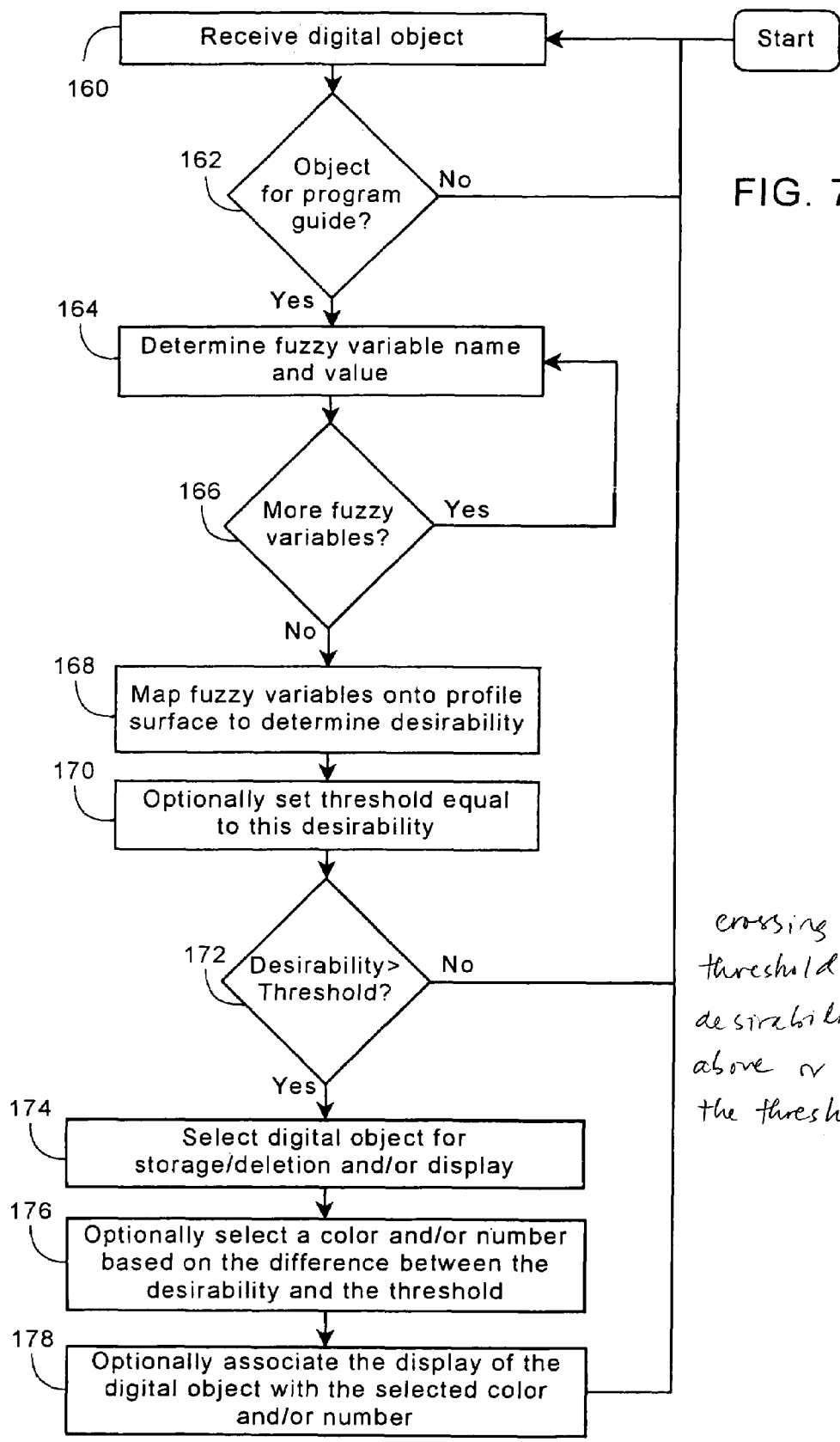
FIG. 7 is a flow chart of a program that can be implemented by the IRD of FIG. 2 to select a digital object for deletion from memory or for display in an electronic television program guide in accordance with the teachings of the invention.

A flow chart of a program that can be implemented by the IRD to select a digital object for deletion from memory or for display in an electronic television program guide in accordance with the teachings of the present invention is illustrated in FIG. 7. Preferably, the programmed steps are performed by the microcontroller 58. Once the program is initiated the microcontroller 58 receives a digital object (e.g., a program guide object, an advertising object, etc.) from the satellite antenna 34 as described in detail above (block 160). Once a digital object is received, the microcontroller 58 examines it to determine if it is associated with an electronic program guide (block 162). Preferably, this is accomplished by reading header and/or other information as described in detail above. Preferably, if the object is not directed to the program guide, the program waits for another object to arrive (block 160).

However, if the object is a program guide object (including advertising objects), the microcontroller 58 determines a fuzzy variable (i.e., a variable's name and current value) associated with the program guide object (block 164). This step of determining a fuzzy variable is repeated as long as there are more variables to read (block 166). Preferably, the fuzzy variable(s) are included with the program guide object when it is received. However, a person of ordinary skill in the art will readily appreciate that one or more fuzzy variables associated with a program guide object may be cached locally at the IRD and later associated with the object by a cross referencing code such as an object identification number. Alternatively, one or more fuzzy variables associated with a program guide object may be determined locally by reading "traditional" descriptive attributes (e.g., "comedy" with no numerical value) and assigning a fuzzy value. Similarly, fuzzy variable values may be determined by mapping one variable onto another. For example, if 'Rating' equals 'R', then 'Violence' may optionally be inferred to be 'high'. Similarly, if 'TV-M' has a 'V' content advisory, then 'Violence' is 'very high'. Each fuzzy variable associated with a program guide object describes the relevancy of that attribute to that object. For example, a program guide object representing a particular movie may include two fuzzy variables. The first named "Romance" with a value of "four" and a second named "Comedy" with a value of "eight". Of course the variables names and values may be encoded in any known manner. Preferably, names are used as indices to a text table along with the values 1–10, in 10% quantization.

Once the fuzzy variables are determined, the microcontroller 58 maps each one onto the profile surface 130 to determine a desirability (block 168). The desirability may be used to determine which objects should be stored in memory, which objects should be deleted from memory, which objects should be displayed in an electronic program guide, which objects should be highlighted, and/or which objects should be stored with 'ALL/SOME/NONE' of the available information (as described in detail below). For example, referring to our example profile surface 130 depicted in FIG. 4, an object with "Romance=4" and "Comedy=8" would map to a desirability of six (six might mean 60% desirable). Although visually more complex, any number of variables and dimensions may be accommodated in this manner. Further, any missing variable values may be given a default value. For example, if the profile surface 130 incorporates a variable named "Violence", but a guide object is received without a "Violence" variable, a default value (e.g. four) may be assumed.

Once a desirability is determined, the microcontroller 58 may set the value of a local threshold variable equal to the desirability just determined (block 170) to allow comparing this object's desirability to a subsequent object's desirability. In this manner a "top ten" list may be created whereby the ten programs that rank the highest on a particular user's profile surface may be listed. Of course any number and/or manner of displaying lists of programs according to their respective desirability rankings may be used. Alternatively, the threshold may be preprogrammed by the system and/or by the user.

Regardless of how the threshold is determined, the value of the current object's desirability is compared to the threshold to determine if the threshold has been crossed. Crossing the threshold may mean the desirability is above the threshold or below the threshold. In this example, the microcontroller 58 checks if the desirability, just determined from mapping the fuzzy variables onto the profile surface 130, is above a predetermined threshold (block 172). If the desirability is not above the threshold, the program loops back to receive another digital object (block 160). However, if the threshold is crossed, the microcontroller 58 selects the digital object (block 174).

Selection may be selection for display in an electronic program guide (FIG. 3), selection for storage in memory 70, or selection for deletion from memory 70. For example, all guide objects (including advertising objects) may initially be stored in local memory 70 for quick retrieval (as opposed to slow retrieval if the IRD must wait for a particular object to be periodically rebroadcast by the satellite system). Subsequently, as the memory 70 fills up, the IRD may decide to delete objects unlikely to be used. Similarly, the IRD may reduce the richness or depth of the information by storing less information for certain objects. By determining a desirability for each object based on the user's profile surface 130, the least likely to be viewed objects may be deleted or 'thinned down' first. Optionally, certain objects may not be deleted regardless of their associated desirability. For example, the IRD may need to retain a terse description of all objects associated with programs showing in the next three days in order to display a complete program guide, yet still having progressively longer description for objects of higher desirability. The number of stored cast credits is yet another example to manage RAM using desirability.

Selection for display may include displaying the data associated with certain guide objects in a certain color and/or in a certain order. For example, a top ten list could be displayed. Similarly, high desirability programs could be highlighted in a particular color in the program guide (FIG. 3). The color and/or number for an object may be selected based on the difference between that object's desirability and the predetermined threshold (block 176). Subsequently, the display of that object's data may be associated with the selected color and/or number (block 178). For example, if a top ten list is displayed, all guide objects with a higher desirability than the eleventh highest guide object's desirability would be displayed in the top ten list. Similarly, all grid boxes 104 associated with a guide object greater than a system defined and/or user defined threshold could be highlighted in green. Of course, more than one threshold and more than one color may be used.

Many other display types are possible. For example, in an alternate embodiment, a grid guide is displayed which only includes channels whose object's attributes map above a certain threshold. Also, color for objects of fuzzily determined genres or other attributes could be used to color the most 'funny' program, color the 'younger children' programs, etc., which does not merely relate to a broadcast category but determined at the IRD by a profile surface 130.

Figure 8:
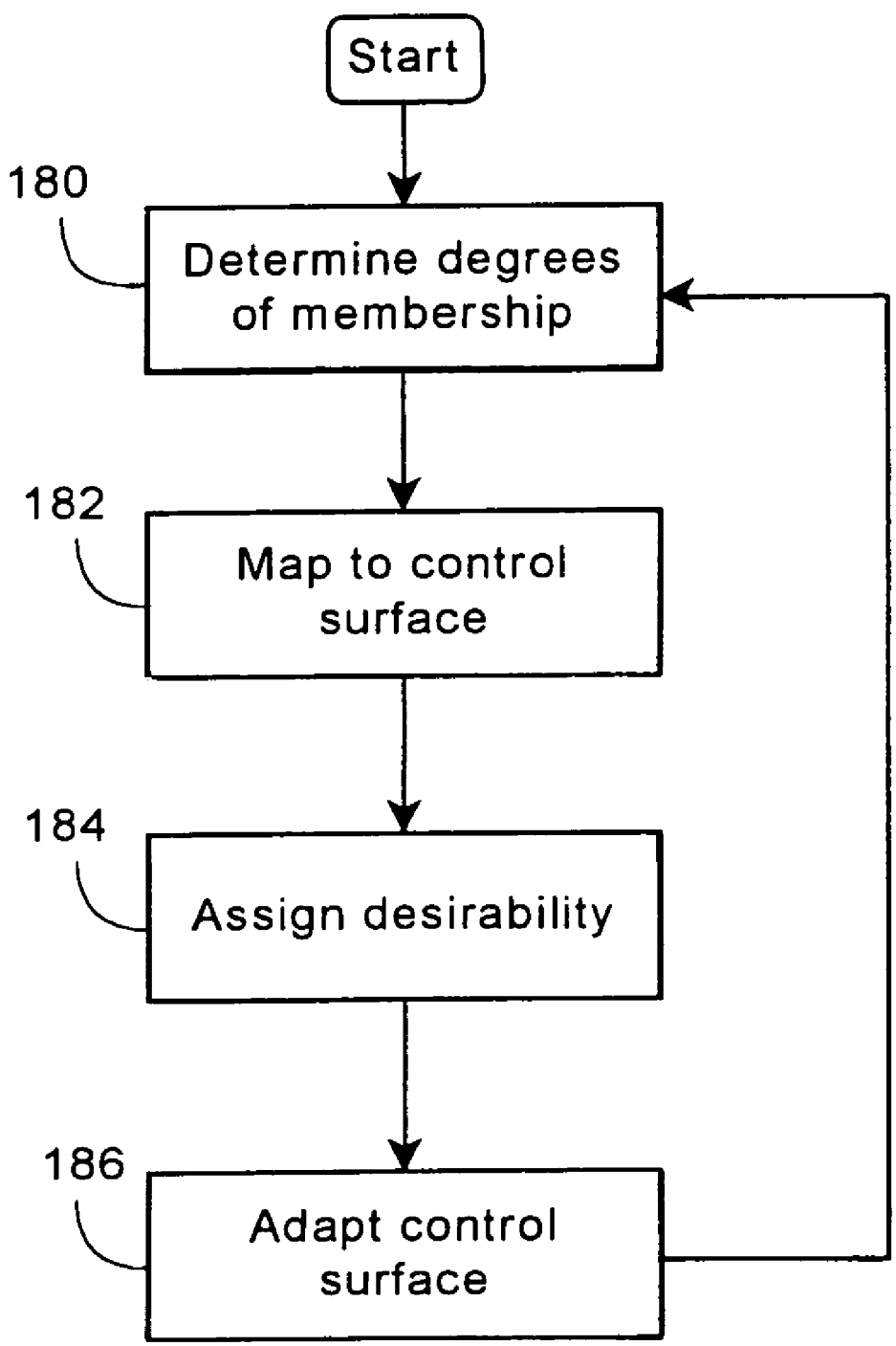
FIG. 8 is a flow chart of a program that can be implemented by the IRD of FIG. 2 to continually adjust the profile surface of FIG. 4.

Illustrated in FIG. 8 is a flow chart which represents a program that could be used to continually adjust the profile surface 130 during operation. At a block 180, a degree of membership is determined for each fuzzy variable of each digital object associated with a selected television program. Each digital object's particular combination of membership is then mapped onto a multi-dimensional profile surface 130, such as the one in FIG. 4, at a block 182. From the mapping, a desirability for storage and/or display is assigned to each digital object at a block 184. The final dimension of the profile surface 130 at the coordinates dictated by the degrees of membership for the digital object is the assigned desirability. Finally, at a block 186 the profile surface 130 is adapted for efficiency by adjusting its shape. The shape of the profile surface 130 is adjusted by modifying the weights of the rules used to assign membership and/or moving the centroids of the membership functions in response to performance metrics. The process of FIG. 8 may be iterated periodically as needed. A person of ordinary skill in the art will readily appreciate that any one of a number of known algorithms may be used to adjust the shape of the profile surface 130 (e.g., Hebbian learning, hill-climbing, back propagation, etc.).

In an alternate embodiment, the profile surface 130 may be used to select advertisements for display (e.g., banner ads in the electronic program guide). Further, certain program guide objects may include hidden fuzzy variables to further refine advertisement selection. For example, a program about stock trading may contain a high value for a hidden variable name 'Income'. In another example, any viewer of the superbowl may be target for a superbowl memorabilia advertisement.

In summary, persons of ordinary skill in the art will readily appreciate that a method and apparatus for storing and displaying digital objects associated with an electronic television program guide based on fuzzy logic has been provided. Systems implementing the teachings of the present invention can enjoy digital object selection associated with electronic television program guides which is more consistent with a user's preferences as well as reduced memory requirements.

The foregoing description has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended hereto.

What is claimed is:

1. A method for selecting a first digital object for display in an electronic television program guide comprising:
   receiving the first digital object from a direct-to-home satellite communication system;
   determining first and second fuzzy variable values associated with the first digital object;
   creating an at least three dimensional profile surface adapted for determining preferences associated with a television viewer by determining a first desirability value associated with two or more input variables and determining second desirability value associated with the two or more input variables, the three dimensional profile surface comprising N dimensions, where N is any number greater than or equal to three, N−1 dimensions are associated with the two or more input variables, and a remaining dimension is associated with the first desirability value and the second desirability value and a first set of levels of the two or more input variables used to determine the second desirability value being different than a second set of levels of the two or more input variables used to determine the first desirability value;
   calculating a first priority value by mapping the first and second fuzzy variable values onto the at least three dimensional profile surface;
   comparing the first priority value to a predefined threshold; and
   selecting the first digital object for display in the electronic television program guide if the first priority value crosses the predefined threshold.

2. A method as defined in claim 1, further comprising:
   setting the predefined threshold to the first priority value;
   receiving a second digital object from the direct-to-home satellite communication system;
   determining third and fourth fuzzy variable values associated with the second digital object;
   calculating a second priority value by mapping the third and fourth fuzzy variable values onto the at least three dimensional profile surface adapted for determining preferences associated with a television viewer;
   comparing the second priority value to the predefined threshold; and
   selecting the second digital object for display in the electronic television program guide if the second priority value crosses the predefined threshold.

3. A method as defined in claim 1, further comprising displaying the first digital object in the electronic television program guide.

4. A method as defined in claim 3, further comprising:
   selecting a color based on the comparison between the first priority value and the predefined threshold, and
   associating the display of the first digital object with the selected color.

5. A method as defined in claim 3, further comprising:
   selecting a number based on the comparison between the first priority value and the predefined threshold, and
   associating the display of the first digital object with the selected number.

6. A method as defined in claim 3, wherein the first digital object comprises an advertising object.

7. A method for selecting a first digital object associated with an electronic television program guide for deletion from memory, the method comprising:
   receiving the first digital object from a direct-to-home satellite communication system;
   determining first and second fuzzy variable values associated with the first digital object;
   creating an at least three dimensional profile surface adapted for determining preferences associated with a television viewer by determining a first desirability value associated with two or more input variables and determining a second desirability value associated with the two or more input variables, the three dimensional profile surface comprising N dimensions, where N is any number greater than or equal to three, N−1 dimensions are associated with the two or more input variables, and a remaining dimension is associated with the first desirability value and the second desirability value and a first set of levels of the two or more input variables used to determine the second desirability value being different than a second set of levels of the two or more input variables used to determine the first desirability value;

calculating a first priority value by mapping the first and second fuzzy variable values onto the at least three dimensional profile surface;

comparing the first priority value to a predefined threshold; and selecting the first digital object for deletion from a memory if the first priority value crosses the predefined threshold.

8. A method as defined in claim 7, further comprising:

setting the predetermined threshold to the first priority value;

receiving a second digital object from the direct-to-home satellite communication system;

determining third and fourth fuzzy variable values associated with the second digital object;

calculating a second priority value by mapping the third and fourth fuzzy variable values onto the at least three dimensional profile surface adapted for determining preferences associated with a television viewer;

comparing the second priority value to the predefined threshold; and selecting the second digital object for display in the electronic television program guide if the second priority value crosses the predefined threshold.

9. An apparatus for displaying a first digital object in an electronic television program guide comprising:

a receiver that receives the first digital object from a direct-to-home satellite communication system;

a controller, operatively coupled to the receiver, the controller determining first and second fuzzy variable values associated with the first digital object, the controller creating an at least three dimensional profile surface adapted for determining preferences associated with a television viewer by determining a first desirability value associated with two or more input variables and determining a second desirability value associated with the two or more input variables, the three dimensional profile surface comprising N dimensions, where N is any number greater than or equal to three, N−1 dimensions are associated with the two or more input variables, and a remaining dimension is associated with the first desirability value and the second desirability value and a first set of levels of the two or more input variables used to determine the second desirability value being different than a second set of levels of the two or more input variables used to determine the first desirability value, the controller calculating a first priority value by mapping the first and second fuzzy variable values onto the at least three dimensional profile surface, the controller comparing the first priority value to a predefined threshold, and a display, operatively coupled to the controller, the controller causing the display to present the first digital object in the electronic television program guide if the first priority value crosses the predefined threshold.

10. An apparatus as defined in claim 9, wherein:

the receiver is further adapted to receive a second digital object from the direct-to-home satellite communication system;

the controller is further adapted to determine third and fourth fuzzy variable values associated with the second digital object; and the controller is further adapted to determine the predefined threshold by mapping the third and fourth fuzzy variable values onto the at least three dimensional profile surface.

11. An apparatus as defined in claim 9, wherein:

the controller is further adapted to select a color based on the comparison between the first priority value and the predefined threshold; and the controller is further adapted to associate the display of the first digital object with the selected color.

12. An apparatus as defined in claim 9, wherein:

the controller is further adapted to select a number based on the comparison between the first priority value and the predefined threshold; and the controller is further adapted to associate the display of the first digital object with the selected number.

13. An apparatus for selecting a first digital object associated with an electronic television program guide for deletion from memory comprising:

a receiver that receives the first digital object from a direct-to-home satellite communication system;

a controller, operatively coupled to the receiver, the controller determining first and second fuzzy variable values associated with the first digital object, the controller creating an at least three dimensional profile surface adapted for determining preferences associated with a television viewer by determining a first desirability value associated with two or more input variables and determining a second desirability value associated with the two or more input variables, the three dimensional profile surface comprising N dimensions, where N is any number greater than or equal to three, N−1 dimensions are associated with the two or more input variables, and a remaining dimension is associated with the first desirability value and the second desirability value and a first set of levels of the two or more input variables used to determine the second desirability value being different than a second set of levels of the two or more input variables used to determine the first desirability value, the controller calculating a first priority value by mapping the first and second fuzzy variable values onto the at least three dimensional profile surface, the controller comparing the first priority value to a predefined threshold, and a memory, operatively coupled to the controller, the controller causing the memory to delete the first digital object if the first priority value crosses the predefined threshold.

14. An apparatus as defined in claim 13, wherein:

the receiver is further adapted to receive a second digital object from the direct-to-home satellite communication system;

the controller is further adapted to determine third and fourth fuzzy variable values associated with the second digital object; and the controller is further adapted to determine the predefined threshold by mapping the third and fourth fuzzy variable values onto the at least three dimensional profile surface.

* * * * *